United States Patent

[11] 3,627,808

| | | |
|---|---|---|
| [72] | Inventor | Roland Streck |
| | | Marl, Germany |
| [21] | Appl. No. | 780,575 |
| [22] | Filed | Dec. 2, 1968 |
| [45] | Patented | Dec. 14, 1971 |
| [73] | Assignee | Chemische Werke Huels A.G. |
| | | Marl, Germany |
| [32] | Priority | Dec. 8, 1967 |
| [33] | | Germany |
| [31] | | P 16 43 839.4 |

[54] PRODUCTION OF TRIPHENYLALUMINUM
12 Claims, No Drawings

[52] U.S. Cl. ................................................. 260/448 A
[51] Int. Cl. ..................................................... C07f 5/06
[50] Field of Search ...................................... 260/448 A

[56] References Cited
UNITED STATES PATENTS

| | | | |
|---|---|---|---|
| 2,270,292 | 1/1942 | Grosse........................ | 260/448 A |
| 3,341,562 | 9/1967 | Lehmkuhl et al............. | 260/448 |

OTHER REFERENCES

Surtees, Rev. of Pure and Applied Chem., Vol. 13, pp. 91–94 (1963)

*Primary Examiner*—Tobias E. Levow
*Assistant Examiner*—H. M. S. Sneed
*Attorney*—Millen, Raptes & White

ABSTRACT: For the production of triphenylaluminum in high yields, $(C_6H_5)_n AlCl_{3-n}$ is reacted with $AlR_3$ wherein $n$ is a member above 0 and less than 3 and R represents lower alkyl.

PRODUCTION OF TRIPHENYLALUMINUM

BACKGROUND OF THE INVENTION

This invention relates to a process for the production of triphenylaluminum.

It is conventional for triphenylaluminum to be produced by reacting diphenylmercury with metallic aluminum (Friedel and Crafts, Ann. chim. et phys. 14, 433 [1888]). However, this process is unsuitable for a production on an industrial scale, because of the high toxicity and the difficult preparation of the organic mercury compounds.

Triphenylaluminum can also be produced by the reaction of triphenylboron with triethylaluminum; in this process, the readily volatile triethylboron is distilled off, and triphenylaluminum is obtained as the residue (R. Köster and G. Bruno, Liebigs Ann. 629, 89 [1960]). However, triphenylboron is not readily available, either, and must first be produced by a highly complex route.

Of additional pertinence is that although aluminum chloride can be reacted with aryl Grignard compounds (British Pat. No. 824,944; German Published Applications 1,140,576 and 1,167,835), phenyllithium (G. Wittig and D. Wittenberg, Liebigs Ann. 606, 13 [1957]) or phenylsodium (U.S. Pat. No. 2,960,516), such processes must be conducted in ether solvents and thus cannot produce the pure triarylaluminum compounds, but only the etherates thereof. In such processes, the etherates cannot be completely freed of ether without losses and decomposition.

Another process comprises the reaction of sodium tetraethylaluminum with benzene in the presence of sodium alcoholate to result in sodium tetraphenylaluminum and ethane (U.S. Pat. No. 3,341,562). The sodium tetraphenylaluminum is then reacted with aluminum chloride, or preferably dimethylaluminum chloride, to produce triphenylaluminum, there being also obtained, in the latter case, trimethylaluminum. A disadvantage of this process is the very slow rate of reaction of the first stage, requiring several days until a conversion of 70 percent is obtained. Another drawback is that more than minor catalytic amounts of sodium alcoholate are necessary, optimum results requiring up to 1 mol per 1 mol of sodium tetraethylaluminum. Furthermore, trimethylaluminum, obtained in stoichiometrically molar amounts, is not always desirable and even a nuisance when produced in very large quantities.

A further way suggested for the production of triphenylaluminum is the reaction of phenylsodium with dimethylaluminum chloride, resulting in a yield of 81 percent (Doctor's Thesis of W. Kleine-Doepke, TH [Technical College] Aachen, 1964). Although the reaction takes place smoothly, there is again the disadvantage of the production of large amounts of trimethylaluminum, as in the aforementioned method.

Finally, the dehalogenation of phenylaluminum sesquichloride (accessible by the reaction of chlorobenzene with activated aluminum, Belgian Pat No. 608,129), to form triphenylaluminum has been attempted in various ways. In this connection, it proved to be suitable first to remove the phenylaluminum dichloride by complex formation with sodium chloride and to dehalogenate, with sodium, only the diphenylaluminum chloride. Although the yield of this latter stage amounts to 80 percent, the yield, when based on all the phenyl groups present in the phenylaluminum sesquichloride, is only 53.3 percent (Doctor's Thesis of W. Kleine-Doepke, TH Aachen, 1964). A further disadvantage of the dehalogenation processes is that there is always obtained, as the byproduct, a large amount of solid sodium chloride which is detrimental to the agitatability and heat transfer of the reaction mixtures, and which involves further steps for the removal of same. Accordingly, heretofore there has been no process for the production of triphenylaluminum which leads to satisfactory yields and is relatively simple to conduct.

SUMMARY OF THE INVENTION

Bearing in mind the above disadvantages of the prior art, it is an object of the invention to provide an improved process for the production of triphenylaluminum.

Upon further study of the specification and claims, other objects and advantages of the present invention will become apparent.

To attain these objects, triphenylaluminum is produced by reacting phenylaluminum chlorides of the general formula $(C_6H_5)AlCl_{3-n}$, wherein $n$ is a whole or fractional number larger than zero but less than 3, with a lower trialkylaluminum being preferably present in a quantity at least sufficient for the substantially complete binding of the halogen as dialkylaluminum chloride. The reaction mixture is then usually resolved, preferably by distillation.

DETAILED DISCUSSION OF THE INVENTION

Contrary to expectation, there is not obtained a substantially equilibrium mixture of reactants (phenylaluminum halogenide and trialkylaluminum), and products (triphenylaluminum and dialkylaluminum halogenide) in accordance with the following equation:

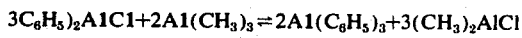

Instead, the reaction proceeds practically completely in the direction of the arrow to the right. This can be seen from the fact that, when reacting stoichiometric amounts of both reactants, there is obtained as the distillate only the dialkylaluminum chloride, instead of a mixture of the two highly volatile components of the system, which would actually be expected (in the above example, dimethylaluminum chloride and trimethylaluminum, the boiling points of which are almost identical). Consequently, it is not necessary to employ an excess of trialkylaluminum over the amount given by the general relationship:

wherein $n$ is a number above 0 and less than 3, preferably about 1.0 to 2.0. However, it is possible to employ an excess, inasmuch as it does not interfere with the reaction. In general, there is used about a 0 to 50, preferably 0 to 20 percent excess of trialkylaluminum.

The process can be conducted on a batch, semicontinuous or continuous basis. Due to the high melting points of the triarylaluminum compounds, (triphenylaluminum m.p. 198°–200° C.), it is advantageous, especially when operating continuously, to add a solvent having a higher boiling point than the readily volatile dialkylaluminum halogenides. When R represents methyl (b.p. of dimethylaluminum chloride: 125°–130° C.), suitable solvents include, but are not limited to ethylbenzene, xylene or cumene for example, since they boil at 135°–140° C. and 152° C., respectively, and are good solvents for triphenylaluminum, so that the distillation temperature can be kept low, without the occurrence of clogging by the deposition of solid triphenylaluminum. Other inert high-boiling liquid solvents, preferably hydrocarbons or mixtures thereof, are also obviously suitable, e.g., methylnapthalene, solvent naphtha, or kerosene.

Suitable arylaluminum halogenides include diphenylaluminum chloride, phenylaluminum sesquichloride, phenylaluminum dichloride, as well as mixtures thereof with triphenylaluminum or aluminum chloride. Suitable trialkylaluminum compounds include those wherein R is alkyl of one to four carbon atoms, preferably lower alkyl such as trimethylaluminum, triethylaluminum, tripropylaluminum, as well as the mixed triorganoaluminum compounds produced by the coproportionation of these compounds with one another or also with triphenylaluminum.

The dialkylaluminum chloride, which is distilled off, can be utilized as such (e.g. diethylaluminum chloride as a catalyst component for the stereospecific polymerization of propene or butene(1)), or it can be reconverted into the trialkylaluminum, for example by reaction with sodium, as mentioned for example in the German Pat. No. 1,018,061, U.S. Pat. Nos. 2,270,292 and 2,863,894, Belgian Pat. No. 568,231, British Pat. No. 811,076 etc.

The above technique permits the simultaneous but separate preparation of triphenylaluminum and trimethylaluminum, and if desired, with no buildup of the latter, since it can be recycled for the production of more triphenylaluminum. Thus, the present invention permits the production of both compounds at varying rates of production in accordance with demand.

In general, the main reaction for the production of triphenylaluminum can be conducted at varying temperatures depending on the reactants employed. It is preferred, however, to use temperatures of about $-20°$ to $+150°$, particularly $0°$ to $80°$ C.

With respect to reaction pressures, subatmospheric, atmospheric and superatmospheric pressures are operable. It may be advantageous to use subatmospheric pressures when conducting the reaction continuously and combining it with the fractionating step, but there are no critical pressure limits for the reaction itself.

As the reaction is complete immediately after mixing the reactants, residence times are not critical. At higher temperatures, however, it is preferable not to exceed 1 hour in order to minimize losses by decomposition of the organoaluminum compounds.

The distillation step may be conducted after the reaction is terminated; in a continuous operation, both steps may occur simultaneously in a countercurrent column. Preferred temperatures and pressures for the distillation are $50°$ to $200°$ C. and $10^{-6}$ to $10^{-2}$ atmospheres absolute. Aside from distillation, other conventional separation techniques can be used, such as crystallization, chromatography, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Phenylaluminum sesquichloride (130 g.) having a Cl/Al ratio of 1.53, is mixed with a solution of 48 g. of trimethylaluminum in 50 g. of benzene, the temperature of the mixture increasing to about $50°$ C. during this step. By distillation under vacuum (0.1 torr [mm. Hg]) until a bath temperature of $120°$ C. is reached, there is obtained as overhead 140.1 g. of a product having a Cl/Al ratio of 0.96 and an aluminum content of 19.43 percent, i.e., a benzene-containing, almost pure dimethylaluminum chloride.

The distillation residue (84.5 g.) contains 12.1 percent aluminum at a Cl/Al ratio of 0.05. By recrystallization from toluene, there is obtained therefrom 76.2 g. (88.6 percent of the theoretical yield) of pure triphenylaluminum (m.p. $197°$ C.).

EXAMPLE 2

Phenylaluminum chloride (221 g.) having a Cl/Al ratio of 0.72 is reacted with 61 g. of triethylaluminum, and distilled at 0.1 torr up to a bath temperature of $180°$ C. In this process there is obtained 92 g. of a distillate having a Cl/Al ratio of 0.91, and 184 g. of a residue resulting, after recrystallization from toluene, in 161 g. of pure triphenylaluminum, corresponding to 82.3 percent of the theoretical yield.

The preceding examples can be repeated with similar success by substituting the generically or specifically described reactants and/or operating conditions of this invention for those used in the preceding examples.

Furthermore, it is obvious to a person skilled in the art that the yields can be improved beyond the values stated above by operating continuously with short residence times in the heated zones, as well as by processing of intermediate fractions and mother liquors.

The triphenylaluminum produced in accordance with the present invention can be employed as an intermediate for the production of other metallic or nonmetallic phenyl compounds—e.g., phenylmercury compounds, phenylsilicone oils, triphenylphosphine—for the introduction of phenyl groups into organic compounds, as a component for polymerization catalysts, and as a high-energy fuel for solid rocket propellants. For prior art which teaches how to perform these syntheses, reference is invited to, for example the reviews given by Karl Ziegler in the chapter on "Organo-aluminium Compounds" contained in "Organometallic Compounds" (Editor H. Zeiss, published 1960 by Reinhold Publishing Corp. N.Y.) and by Roland Köster and Paul Binger in "Advances in Inorganic Chemistry and Radiochemistry," Vol. 7, pages 263–348 (1965).

The aforementioned phenylsilicone oils are valuable thermostable transformer insulating oils, whereas phenylmercury compounds are being used as disinfectants and fungicides.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of triphenylaluminum comprising reacting a phenylaluminum chloride of the general formula $(C_6H_5)_n AlCl_{3-n}$, wherein $n$ represents a number larger than zero but smaller than 3, with a trialkylaluminum compound of the formula $AlR_3$ wherein R represents lower alkyl, there being employed an excess of $0-50$ percent of $AlR_3$ according to the following reaction equation:

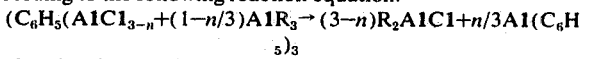

$(C_6H_5(AlCl_{3-n}+(1-n/3)AlR_3 \rightarrow (3-n)R_2AlCl+n/3Al(C_6H_5)_3$ wherein $n$ is a number above 0 and less than 3.

2. A process as defined by claim 1 wherein said $AlR_3$ is employed in a sufficient quantity to bind the chlorine as dialkylaluminum chloride.

3. A process as defined by claim 1 wherein R is methyl or ethyl.

4. A process as defined by claim 2 wherein R is methyl or ethyl.

5. A process as defined by claim 1 wherein the reaction is conducted in an inert solvent having a boiling point higher than the boiling point of $R_2AlCl$.

6. A process as defined by claim 4 wherein the reaction is conducted in an inert solvent having a boiling point higher than the boiling point of $R_2AlCl$.

7. A process as defined by claim 1 further comprising fractionally distilling the reaction mixture to recover the triphenylaluminum, and formed dialkylaluminum chloride, reacting the latter with sodium to form trialkylaluminum and recycling same to the reaction mixture.

8. A process as defined by claim 2 further comprising fractionally distilling the reaction mixture to recover the triphenylaluminum, and formed dialkylaluminum chloride, reacting the latter with sodium to form trialkylaluminum and recycling same to the reaction mixture, the reaction and distilling being conducted simultaneously.

9. A process as defined by claim 4 further comprising fractionally distilling the reaction mixture at $50°-200°$ C. and $10^{-6}$ to $10^{-2}$ atmospheres absolute to recover the triphenylaluminum, and formed dialkylaluminum chloride, reacting the latter with sodium to form trialkylaluminum and recycling same to the reaction mixture.

10. A process as defined by claim 6 further comprising fractionally distilling the reaction mixture at $50°-200°$ C. and $10^{-6}$ to $10^{-2}$ atmospheres absolute to recover the triphenylaluminum, and formed dialkylaluminum chloride, reacting the latter with sodium to form trialkylaluminum and recycling same to the reaction mixture, the reaction and distilling being conducted simultaneously.

11. A process as defined by claim 1, wherein the excess is 0–20 percent and $n$ is 1.0 or 2.0.

12. A process as defined by claim 3, wherein the excess is O −20 percent and $n$ is 1.0 or 2.0.

* * * * *